| | | |
|---|---|---|
| | | US005271814A |
| United States Patent [19] | [11] Patent Number: | 5,271,814 |
| Metzler | [45] Date of Patent: | Dec. 21, 1993 |

[54] THIN FILM ELECTROCOAGULATION FOR REMOVAL FOR CONTAMINANTS FROM LIQUID MEDIA

[75] Inventor: David M. A. Metzler, 1001 Winchester, Kansas City, Mo. 64126

[73] Assignee: David M. A. Metzler, Kansas City, Mo.

[21] Appl. No.: 854,360

[22] Filed: Mar. 19, 1992

[51] Int. Cl.$^5$ .............................................. C02F 1/463
[52] U.S. Cl. ...................... 204/149; 204/186; 204/188; 204/228; 204/275; 204/302; 204/305
[58] Field of Search ............... 204/186, 188, 302, 305, 204/306, 149, 228, 275, 299 R

[56] References Cited

U.S. PATENT DOCUMENTS

| 3,679,556 | 7/1972 | Doevenspeck | 204/269 |
|---|---|---|---|
| 4,098,673 | 7/1978 | Zucker | 204/302 |
| 4,123,339 | 10/1978 | Gale et al. | 204/149 |
| 4,123,340 | 10/1978 | Kammel et al. | 204/149 |
| 4,149,953 | 4/1979 | Rojo | 204/269 |
| 4,200,516 | 4/1980 | Pope | 204/302 |
| 4,285,805 | 8/1981 | Stegelman | 208/113 |
| 4,350,590 | 9/1982 | Robinson | 210/243 |
| 4,872,959 | 10/1989 | Herbst et al. | 204/109 |
| 4,917,782 | 4/1990 | Davies | 204/152 |
| 4,998,427 | 1/1991 | Wright | 204/304 |

Primary Examiner—John Niebling
Assistant Examiner—William T. Leader
Attorney, Agent, or Firm—Litman, McMahon & Brown

[57] ABSTRACT

A thin film electrocoagulation liquid treatment apparatus includes a nonconductive housing formed by opposite top and bottom walls, opposite side walls, and tubular end members with slots therethrough which define a treatment chamber. Pluralities of elongated electrodes extend between the side walls and are spaced along the top and bottom walls in spaced apart interleaved relation to define a serpentine fluid treatment path. The tubular end members form fluid connections, one end member receiving liquid to be treated from a supply conduit and the other discharging the treated liquid to a discharge conduit. A DC power supply has opposite poles thereof connected respectively to the sets of electrodes in such a manner that the polarity on succeeding electrodes is opposite. The first two electrodes in the flow direction of the fluid path are preferably connected to the negative pole of the power supply. A treatment process employing the treater apparatus includes pressure differential monitoring across the treater and flow direction reversal to avoid clogging the treater and temperature differential monitoring across the treater to optimize the consumption of electrical power by the process.

17 Claims, 3 Drawing Sheets

THIN FILM ELECTROCOAGULATION FOR REMOVAL FOR CONTAMINANTS FROM LIQUID MEDIA

BACKGROUND OF THE INVENTION

In attempting to control environmental pollution from industries, human waste, and naturally decomposing minerals and chemicals, a wide variety of chemical and mechanical processes have been developed.

Chemical methods have attempted to cause a predetermined reaction between chemical additives and impurities contained within an aqueous solution. The most common reactions are designed to cause coalescences of the impurities and the chemical additives. As the coalescing occurs the materials flocculate and the particles which are then formed layer to their specific gravity within the aqueous solution. Many times, to effectively remove the chemically flocculated contaminants, additional chemicals are added to increase the size of the particles and thus the specific gravity of the particle. Increasing the size of the floc with additional chemical additives causes more rapid settling and better defined segregated layering within the solution. Air can be added to some solutions to cause a more rapid rise of the flocculated particles when the formed particles have a lighter specific gravity than the base solution. Combinations of chemicals and air can be used for complex aqueous solutions that have more than one contaminant.

Mechanical methods are designed to achieve similar results as chemical additives, but to a lesser degree of purity in the final aqueous solution. Filters, centrifuges, plate separators, and clarifiers are the most common mechanical methods employed to remove contaminants from aqueous solutions. In most cases the impurities that are removed mechanically are suspended solids or dissolved particles that are flocculated by changes in process temperature or retention time in the processed solution.

Over two decades ago, the chemical and mechanical methods of treating the aqueous solutions were thought to be adequate treatment prior to disposal. Disposal of the treated aqueous solution into the oceans, streams, lakes, and underground wells were common. Tests have shown that small amounts of impurities that escaped treatment from chemical or mechanical process or a combination of both processes have accumulated in soils, ground waters, lakes, and river beds. Many rivers and streams are now considered to be wastesites. Lakes have been drained and their lake beds have been hauled away to be treated as hazardous waste. Many times the chemical residue left from an original reaction which was used to remove a waste from industrial aqueous solutions became the residual waste and required additional chemicals and/or processing but did not receive additional processing, and the aqueous solution was unsafely discharged to the natural environment.

Causing the coalescence of contaminants without the addition of chemicals has been successfully performed by electrolytic treatment for several years. However, the previous electrolytic processes created large quantities of metal and other contaminant sludges which added to the cost of disposal. Many current systems for performing electrolytic treatments are batch and dump methods which have a high labor cost, since each batch is individually sampled, treated, and separated prior to beginning the second batch.

On-line electrolytic systems, as opposed to batch systems, require large spaces for process retention time. Retention time is critical for the on-line system to obtain treatment standards. Retention time can be shortened with higher voltage and more electrical power consumption. On-line systems usually require a larger electrical supply, due in part to the retention time and the voltage required to electrically charge the pipe mass which is delivering the charge and transporting the liquid through the system. Capital costs are high and the cost for electrical power to operate the system is expensive. Since the required voltage and amperage across the poles is high the resulting flux is such that the piping deteriorates quickly, and maintenance for replacing the piping is frequent.

Accordingly, there is a need for an efficient, low cost liquid contaminant removal system which embodies the best of all previous systems, yet remains flexible to treat a wide variety of waste streams on-line with minimal maintenance and energy cost.

SUMMARY OF THE INVENTION

The present invention provides a thin film electrocoagulation apparatus for electrolytically treating aqueous solutions which have contaminants therein. The aqueous solution which is to be treated is flowed through a serpentine fluid path formed by a plurality of interleaved electrodes of alternating DC polarity. The bars are preferably solid metal, and the metal selected for the positive and negative electrodes depends upon the contaminant to be coalesced. The serpentine configuration of the fluid path provides a desired electrode surface area in a compact treater apparatus, and the turns in the path cause turbulence in the solution which promotes mixing the liquid, thus assuring more thorough treatment of the solution.

The treater apparatus is formed by a nonconductive housing including spaced apart side walls and spaced apart top and bottom walls which define a treater chamber. A first plurality of electrodes is distributed along the bottom wall in evenly spaced relation, and a second plurality of electrodes is distributed along the top wall between the bottom wall electrodes. The electrodes extend between the side walls, thereby providing the serpentine fluid path formed by mutual spaces between successive sets each of a bottom wall electrode and a top wall electrode and spaces between the bottom wall electrodes and the top wall and between the top wall electrodes and the bottom wall. The housing ma be formed from molded plastic which may be glass fiber reinforced.

The electrodes may be individual members connected through the top and bottom walls by conductive fasteners through fluid seals to bus bars which extend along the outer surfaces of the top and bottom walls and which are connected to a respective power supply pole. Alternatively, each set of electrodes for the upper or lower wall can be formed as an integral electrode unit having a somewhat comb-shaped cross section. The two electrode units are positioned within the housing with the electrodes of one unit interleaved with the electrodes of the other unit. The comb-shaped integral electrode units, when positioned in an interleaved manner, provide a serpentine fluid path which is continuously electrified when the electrodes are activated.

The ends of the treater housing are formed by tubular fluid distribution members which have provisions on their ends for fluid connection to conduits of a thin film electrocoagulation process. The tubular members communicate with the treatment chamber by elongated apertures or slots through their cylindrical walls. Each of the tubular members has an inlet end on an inlet side of the treater housing and an outlet end on an outlet side of the housing. This configuration of the housing provides for simplified and convenient selection of the flow direction through the treater apparatus. The inlet ends of the tubular members are connected by a two-way solenoid controlled supply valve to an supply conduit, and the outlet ends are connected by a two-way solenoid controlled discharge valve to a discharge conduit. The valves are operated in coordination such that a forward inlet end of a first tubular member and a diagonally opposite, forward outlet end of the second tubular member are opened to flow a liquid through the treater apparatus in a forward direction. Conversely, for reverse flow, a reverse inlet end of the second tubular member and a diagonally opposite, reverse outlet end of the first tubular member are opened to flow the liquid through the treater in a reverse direction.

In electrolytically treating some solutions to coalesce contaminants therein, the treater may become partially clogged by a sludge of the coalesced contaminants or by the adhesion of contaminants to the electrodes or walls of the treater housing. To avoid clogging, the pressure differential between liquids entering and exiting the treater is monitored by fluid pressure sensors which are connected to a system controller, which is preferably a computer. When the pressure differential exceeds a selected level, the supply and discharge valves are activated to reverse the flow direction through the treater to help dislodge clogged areas by fluid pressure. Flow reversal may occur multiple times, with delays between each, until desired flow is achieved. The configuration of the treater of the present invention facilitates reversing the flow direction through the treater since it is not necessary to affect the flow directions of the supply conduit or the discharge conduit. The system controller may be programmed to detect a severe clogging situation and cause an alarm and process shutdown in such an event.

A DC voltage is applied across the sets of electrodes to electrolytically treat the solution flowing through the fluid path. The voltage to be applied depends on a number of factors including the contaminant to be coalesced and its concentration in the solution, which affects the conductivity of the solution, the size of the treater, the spacing among the electrodes, the desired speed of treatment, the flow velocity, and other factors. In general, the temperature differential between liquid entering and exiting the treater can be used as a gauge of the voltage to be applied and the manner in which the voltage should be adjusted. Thus, if the temperature rise of exiting liquid is too high, it is generally an indication that the voltage is too high and that power is being wasted to merely heat the solution, with no increase in treatment effectiveness. In such a case, the voltage would normally be reduced.

Temperature sensors convey the inlet and exit temperatures of the solution under treatment to the system controller or computer which controls the DC power supply in such a manner as to vary the voltage output in response to the measured temperature differential. In some instances, it is desirable for the solution under treatment to be heated, such as when the destruction of biological contaminants is one of the purposes of the treatment. In such a case, it is still desirable to monitor and control the heat rise as the solution passes through the treater.

The resulting flux field formed from electrifying the electrodes causes various materials which are contaminants in the solution to coagulate, thus allowing removal from the aqueous solution. Removal of organics, fats, metals, and various other chemical compounds such as carpet and fabric dyes, and virtually any COD or BOD compound are common functions of the device. The design of the device allows for maximum usage of voltage and amperage due to the large surface area and thin depth of the aqueous solution as it passes between the series of electrodes of spatially alternating polarity. Preferably, the first two electrodes of the treater fluid path are negatively polarized. Polarity reversing switching is provided to maintain connection of the first two electrodes in the fluid path to the negative pole of the power supply when the flow direction is reversed.

OBJECTS AND ADVANTAGES OF THE INVENTION

The principal objects of the present invention are: to provide an improved electrocoagulation system for coalescing contaminants in liquid media to facilitate subsequent mechanical separation of the contaminants; to provide such a system which avoids inadequacies of prior treatment systems; to provide such a system which causes contaminants in aqueous solutions to flocculate by thin film electrocoagulation; to provide such a system which enhances the treatment process by providing a high surface area per volume of treated solution in combination with a thin depth or interelectrode spacing; to provide such a system which is relatively compact for the treatment surface area provided; to provide such a system having the capability of monitoring the pressure differential across the treater apparatus and the ability to conveniently reverse the flow direction through the treater to unclog the treater; to provide such a system with the capability of monitoring temperature rise in solutions being treated and for automatically adjusting current flow between the DC power supply poles to control the temperature rise; to provide such a system having the capability of maintaining a high temperature rise in selected solutions to destroy biological contaminants therein; to provide such a system including a treater comprising a flat rectangular housing of nonconductive material with sets of elongated electrodes positioned respectively on opposite top and bottom walls in an interleaved manner to form a serpentine fluid path through the treater; to provide such a system in which the sets of electrodes are formed as integral electrode units having a somewhat comb-shaped cross section; to provide such a system in which the treater and the process in general are scalable to accommodate a wide range of solution volume rates; to provide such a system which is suitable for treating a great variety of solutions of contaminants; and to provide such a system which is economical to manufacture and maintain, which is effective and efficient in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral I generally designates a thin film electrocoagulation apparatus which embodies the present invention. The apparatus 1 is adapted for use in a treatment process, such as the thin film electrocoagulation treatment process or system 2 illustrated in FIG. 1 for the flocculation contaminants in liquid media and the removal of the flocculated contaminants from the liquid media. In general, the treater apparatus or treater 1 receives an aqueous solution having the contaminants therein from a supply conduit 3 and discharges the solution through discharge conduits 4 and 5 to a separator tank 6 wherein mechanical separation of the contaminants is facilitated by coalescence of the contaminants. The coalesced contaminants, depending on the specific gravity of the particular contaminants, may be separated by settling or by flotation in the separator tank 6. The clarified effluent is drawn from the separator tank or separator 6 into a collector tank 7 and, if sufficiently purified, may be recycled or sent to an outflow such as a stream or river or, if necessary, is sent to another process (not shown) for further treatment. The removed contaminants, depending on their nature, may also be recycled.

Referring to FIGS. 2-5, the treater 1 includes a treater housing 14 of a generally flattened, rectangular shape. The housing 14 is formed by a top wall 15, a bottom wall 16, and opposite side walls 17 and 18 which define a treatment chamber 19 within the walls 15-18. The ends of the chamber 19 are closed by tubular end members 20 and 2 which have elongated slots or apertures 22 formed through their cylindrical walls within the chamber 19 to provide fluid communication between the members 20 and 21 and the chamber 19. The end members 20 and 21 provide for the connection of the supply conduit 3 and discharge conduit 4 to the apparatus 1, as will be detailed further below. The walls 15-18 and the tubular end members 20 and 21 are nonconductive and are preferably formed of a material such as Plexiglas, a glass fiber reinforced plastic, or the like and of a construction which may be disassembled for periodic maintenance of the treater 1. Although the walls 15 and 16 are referred to respectively as a top wall and a bottom wall and the walls 17 and 18 are referred to as side walls, it should be understood that the treater 1 can be used in virtually any orientation.

The top wall 15 and bottom wall 16 have pluralities of treater electrodes 25 positioned thereon. The top electrodes 26 are positioned in regularly spaced, parallel relation, and the bottom electrodes 27 are similarly oriented and positioned between the top electrodes 26 in an interleaved manner to define a serpentine fluid path 30 through the electrodes 25. Each of the electrodes 25 extends completely between the side walls 17 and 18, as shown in FIG. 5, to confine fluid travelling through the treater 1 to the fluid path 30.

Figures 2, 3, 4, 5:
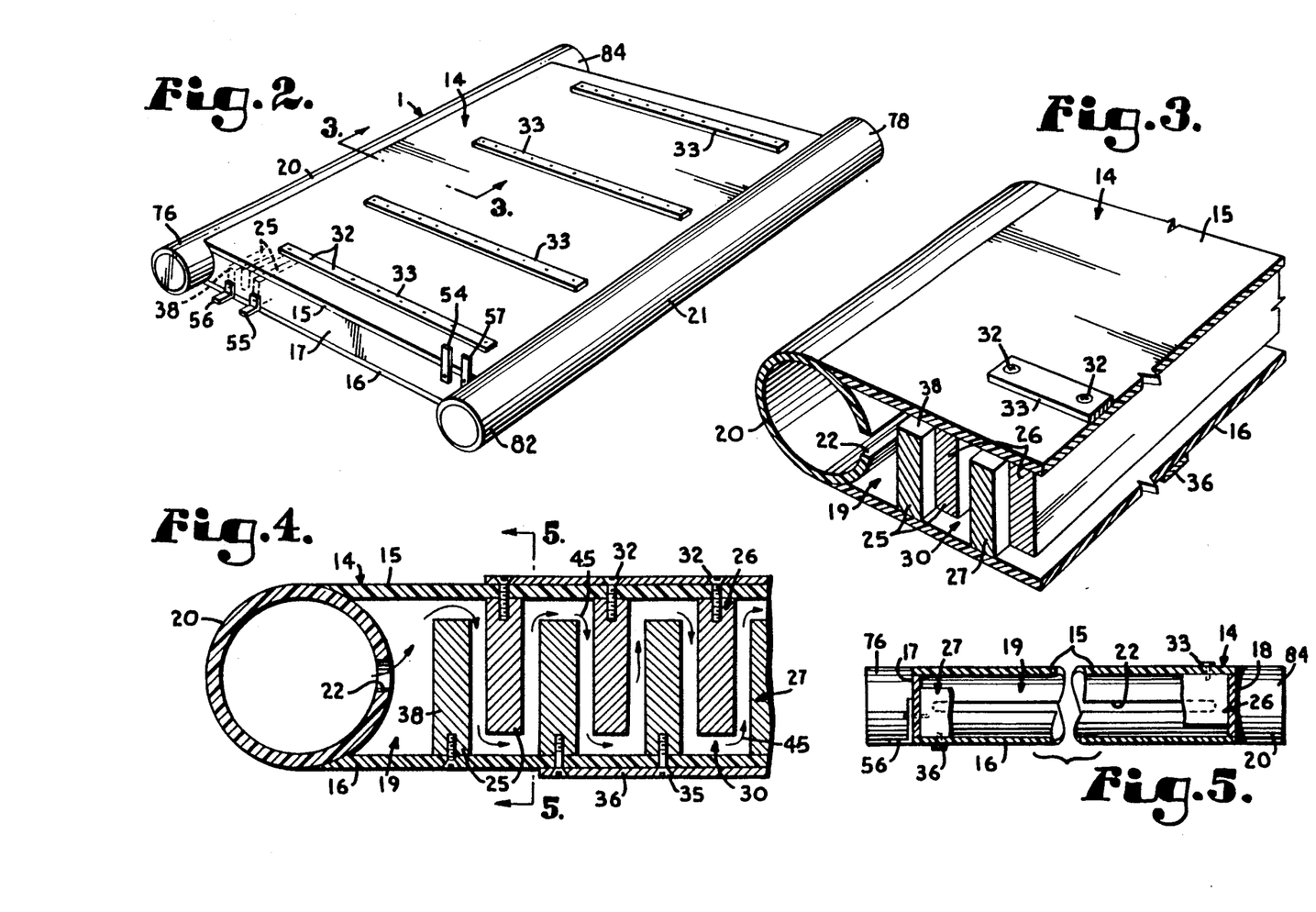
FIG. 2 is a perspective view of the thin film electrocoagulation apparatus of the present invention.
FIG. 3 is an enlarged fragmentary sectional perspective taken on line 3—3 of FIG. 2 and illustrates internal details of the thin film electrocoagulation apparatus.
FIG. 4 is a fragmentary elevational section taken on a line similar to line 3—3 of FIG. 2 and illustrates a serpentine fluid path through an interleaved sequence of electrodes of the apparatus.
FIG. 5 is a fragmentary transverse sectional view taken on line 5—5 of FIG. 4 and at a reduced scale and illustrates further internal details of the apparatus.

As illustrated in FIG. 4, the top electrodes 26 are held in place by fasteners, such as top screws 32, which pass through the upper wall 15 and through a plurality of top electrode bus bars 33 which electrically interconnect the top electrodes 26. Fluid seal members, such as O-rings or the like (not shown) may surround the screws 32 to prevent leakage of fluid through bores in the wall 15 receiving the screws 32. In a similar manner, the bottom electrodes 27 are attached to the bottom wall 16 by bottom screws 35 passing through the bottom wall 16 and bottom bus bars 36 which electrically interconnect the majority of the bottom electrodes 27. It should be noted that extreme end electrodes 38 and 39 (see FIGS. 7 and 8), whether top electrodes 26 or bottom electrodes 27, are not directly connected to the bus bars 33 or 36, for a purpose which will be explained further below.

In an exemplary embodiment of the treater 1, the electrodes 25 are four feet in length, and the distance between succeeding electrodes is about one-eighth inch. (In the drawings, the interelectrode spacing is exaggerated for clarity.) The treater 1 has a high degree of scalability regarding the length, number, and spacing of the electrodes 25, depending on the volume capacity required of the system 2. The electrodes 25 are preferably formed of a metal, such as (but not limited to) lead, titanium, steel, stainless steel, iron, aluminum, nickel, copper, or the like. The metal selected depends on the requirements of the particular contaminant or combination of contaminants and solutions to be treated. The serpentine shape of the fluid path 30 provides a large electrode surface area for a given size of the treater 1 and additionally causes turbulence in the treated liquid to maximize the proportion of the liquid which is brought into close proximity to the electrode surfaces to more thoroughly treat the liquid.

The electrodes 25 are connected to the positive pole 42 or the negative pole 43 of a DC power supply or rectifier circuit 44 (FIGS. 1, 7, and 8) in such a manner that the majority of the electrodes 25 alternate between positive and negative polarity. The exception is that the first two electrodes 25 in the direction of the fluid path 30 are preferably of negative polarity. Empirical evidence seems to suggest that such an arrangement enhances the treatment process; however, the invention is not intended to be limited to any particular theory of operation in this regard. Thus, in the arrangement of electrodes illustrated in FIG. 4, since the end electrode 38 is a lower electrode and is the first electrode in the flow direction indicated by the arrows 45, the end electrode 38 and the top electrodes 26 are connected to the negative pole 43 of the rectifier 44 while the remaining bottom electrodes 27 are connected to the positive pole 42 of the rectifier 44. Fluid entering the fluid path 30 encounters the negatively polarized end electrode 38 and the first top electrode 26 and thereafter encounters succeeding electrodes of alternating polarity.

Figures 6, 7, 8:
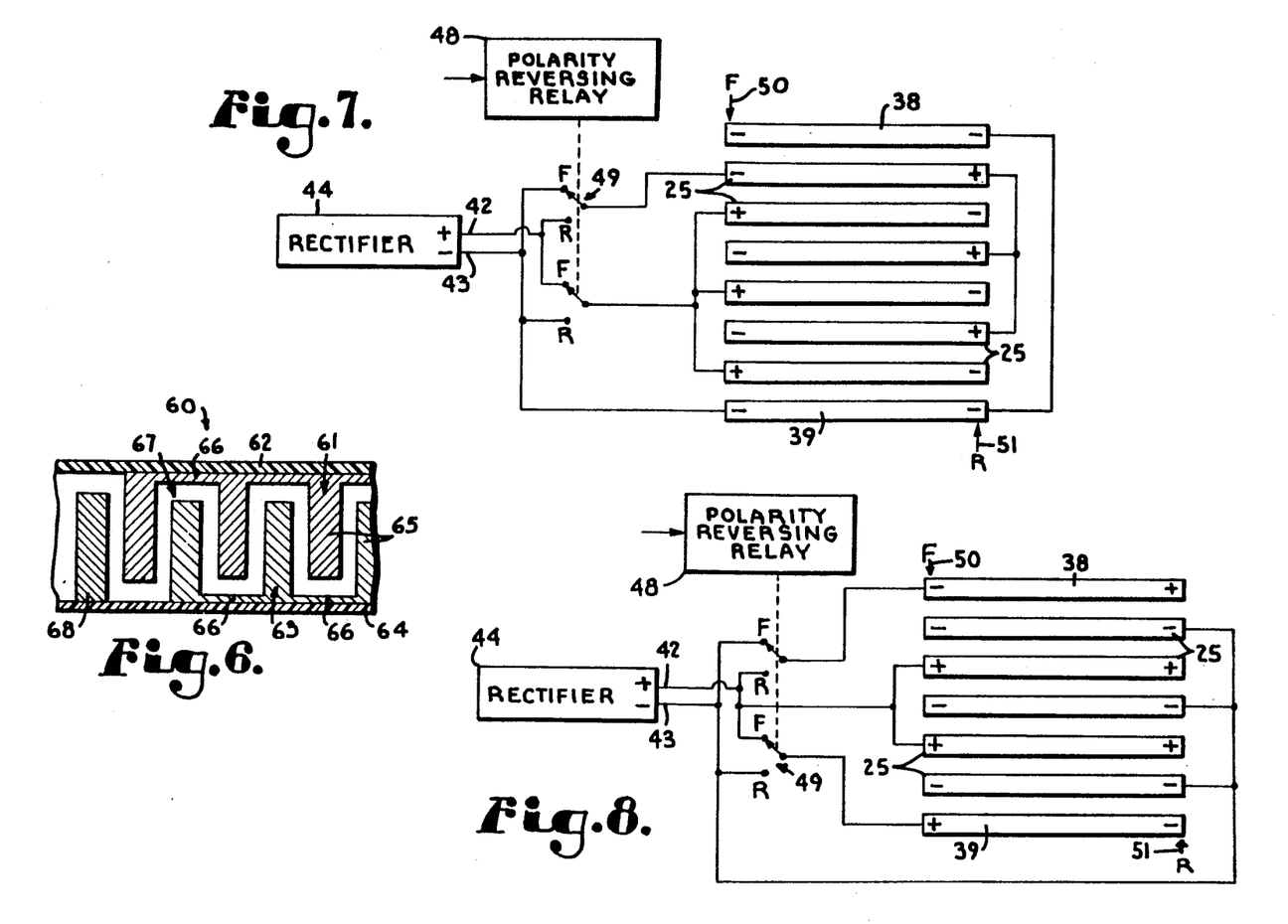
FIG. 6 is a view somewhat similar to FIG. 4 and illustrates an alternative embodiment of the electrodes of the apparatus in the form of comb shaped integral electrode units which form the serpentine fluid path.
FIG. 7 is a schematic diagram illustrating the connection of contacts of a polarity reversing relay to an even number of electrodes of the apparatus of the present invention to provide a desired polarity to the electrodes.
FIG. 8 is a schematic diagram illustrating the connection of contacts of a polarity reversing relay to an odd number of electrodes of the apparatus of the present invention to provide a desired polarity to the electrodes.

Since a capability for reversing the flow direction of the fluid path 30 is desired for flushing the treater 1, some means is necessary for maintaining the first two sequential electrodes in a given flow direction at a negative polarity. FIG. 7 shows a polarity reversing switch arrangement for an even number of electrodes 25 while FIG. 8 shows a polarity reversing switch arrangement for an odd number of electrodes 25. Each employs a polarity reversing relay 48 including a solenoid (not shown) which controls a pair of double pole-double throw (DPDT) switch contact sets 49. The contact sets 49 are capable of a forward state F or a reverse state R. The relay 48 is controlled to change state when the flow direction of the fluid path 30 is reversed. An F-arrow 50 in FIGS. 7 and 8 points to the polarities of the electrodes 25 in a forward state F, corresponding to a forward flow direction through the treater 1, while an R-arrow 51 indicates the polarities of the electrodes 25 in a reverse state R of the contacts 49, which corresponds to a reverse flow direction.

With an even number of electrodes 25 in FIG. 7, the end electrodes 38 and 39 ma be connected directly to the negative pole 43 while the remaining electrodes 25 are switched in interleaved groups between the positive pole 42 and the negative pole 43 to cause the first two electrodes in a given flow direction to be of negative polarity. With an odd number of electrodes 25 in FIG. 8, alternating groups of the electrodes 25 are permanently connected respectively to the positive pole 42 or the negative pole 43, and only the end electrodes 38 and 39 are switched in polarity as the flow direction is reversed.

Referring to FIG. 2, the top electrodes 26 are connected to the rectifier 44 by a top electrode terminal 54, while the bottom electrodes 27 are connected to the rectifier 44 by a bottom electrode terminal 55. The end electrodes 38 and 39 are connected to the rectifier 44 by respective end electrodes 56 and 57. Electrical current is distributed among the top electrodes 26 by the bus bars 33 and among the bottom electrodes by the bus bars 36. Depending on the number of electrodes present, the various electrodes 25 may be connected to the rectifier 44 through the polarity reversing relay contacts 49.

FIG. 6 illustrates an alternative embodiment of the electrodes of a treater 60 of the present invention. In FIG. 6, a top integral, multiple electrode unit 61 is mounted on a top wall 62, while a bottom integral, multiple electrode unit 63 is mounted on a bottom wall 64 of the treater 60. Each of the electrode units 61 and 63 is formed by a plurality of elongated electrode elements 65 connected in spaced apart parallel relation by a plurality of integral webs 66. The webs 66 not only connect the electrode elements 65 of a unit 61 or 63 structurally but also electrically. The electrode units 61 and 63 are somewhat comb-shaped in cross section and are mounted with the electrode elements thereof positioned in an interleaved manner to define a serpentine fluid path 67 thereamong. Individual end electrodes 68 are mounted within the treater 60 separate from the units 61 and 63 to provide for polarity reversing switching in the same manner as with the electrodes 25, 38, and 39. The treater 60 is operated in much the same manner as the treater 1 and has the same advantages with the addition that liquid flowing through the treater 60 encounters more uniform electric fields at the turns of the path 67. In contrast, the turns of the fluid path 30 of the treater 1 are somewhat passive electrically since the fluid encounters the nonconductive walls 15 and 16 in the turns of the path 30.

Referring to FIGS. I and 2, the configuration of the tubular end members 20 and 21 provides for convenient flow reversal through the treater 1 without affecting the flow directions through the supply conduit and the discharge conduit 4. The treater 1 is connected to the supply conduit 3 by a solenoid operated two-way supply valve 72 and to the discharge conduit 4 by a solenoid operated two-way discharge valve 73. The valves 72 and 73 are operated in coordination such that for a forward flow direction (indicated by the solid flow arrow 74 in FIG. 1), fluid flows from the supply conduit 3, through the valve 72 in a forward state, through a forward inlet conduit 75 connected to a forward inlet port connection 76 of the end member 20, through the slot 22, through the fluid path 30, through the slot 22 of the end member 21, out a forward outlet conduit 77 connected to a forward outlet port 78 diagonally opposite the forward inlet port 76, and through the discharge valve 73 in a forward state, to the discharge conduit 4. To reverse flow direction through the treater 1 (indicated by the broken flow arrow 80), the valves 72 and 73 are switched to a reverse state, and the liquid flows from the supply valve 72, through a reverse inlet conduit 81 connected to a reverse inlet port 82 at the opposite end of the end member 21 from the forward outlet port 78, through the treater 1 to the end member 20, through a reverse outlet conduit 83 connected to a reverse outlet port 84 of the end member 20 diagonally opposite the reverse inlet port 82, and to the discharge valve 73 to the discharge conduit 4.

Figure 1:
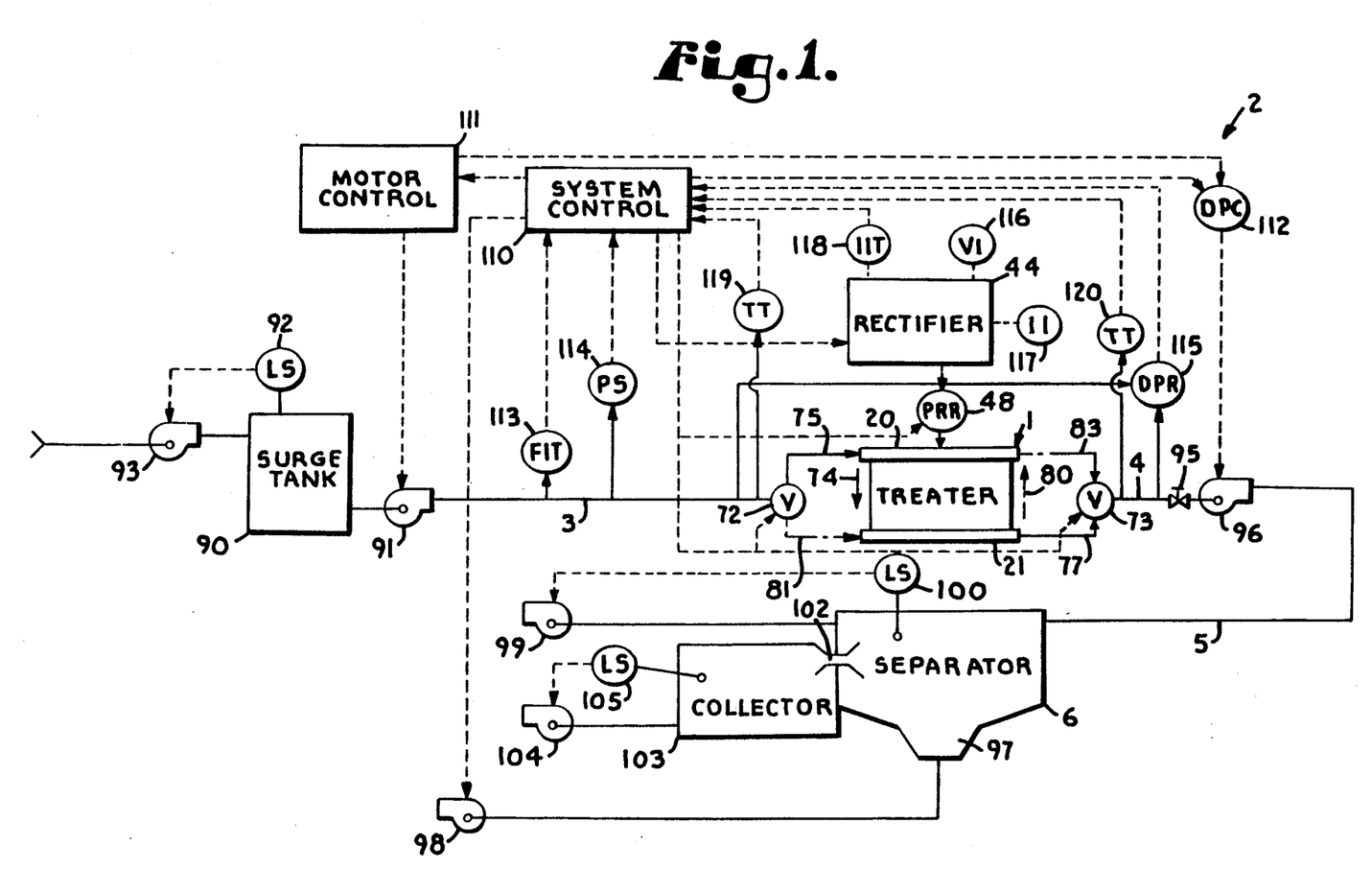
FIG. 1 is a block diagram of a process employing an apparatus for thin film electrocoagulation for removal of contaminants from liquid media which embodies the present invention.

Referring to FIG. 1, the supply conduit 3 receives liquid to be treated from a surge tank 90 through a supply pump 91. The level within the surge tank 90 is controlled by a level switch 92 controlling a fill pump 93 which receives the liquid from an external source, such as another industrial process (not shown). On the discharge side of the treater 1, a pressure throttle 95 in the discharge conduit 4 cooperates with the supply pump 91 and a discharge pump 96 to control the flow of the liquid through the treater 1. The discharge pum 96 feeds the separator 6 through the outer discharge conduit 5.

The separator 6 may be an inclined plate separator or clarifier which collects denser sludge to a lower trough 97 from which the sludge may be drawn off by a sludge pump 98 to a collection vessel for further processing, recycling, disposal, or the like. Lighter floc may be skimmed off the top of the separator 6 by a skim pump 99 as controlled by a level switch 100. In a liquid in which the coalesced contaminants settle out, the clarified effluent is at the top of the separator tank 6. Conversely, if the coalesced contaminants float, the effluent is below the floc. In a situation where some contaminants settle while others float, the effluent is between the contaminant levels. A collector tap 102 is positioned to flow the clarified effluent into a collector tank 103 where it may be pumped by a collector pump 104, as controlled by a level switch 105, to a site of disposal such as a waterway if permitted or to a process for further treatment if necessary, or the effluent may be recycled to an industrial process from which it was received.

The process 2 is monitored and controlled by a system controller 110 which may be in the nature of a conventional personal computer with appropriate software and interfaces or a dedicated type of computer. The supply and discharge pumps 91 and 96 are controlled by way of a main motor control circuit 111, with finer adjustments to the operation of the discharge pump 96 provided by a discharge pump control (DPC) circuit 112. The system controller 110 receives inputs from the supply conduit 3 by way of a flow indicator transmitter (FIT) 113 and a pressure switch (PS) 114. A differential pressure relay (DPR) 115 is adjusted to sense a selected pressure differential between the supply conduit 3 and the discharge conduit 4 and sends a signal to the controller 110 upon the pressure differential exceeding the set point, thereby indicating clogging. This causes the controller 110 to change the state of the supply valve 72 and the discharge valve 76 to reverse flow direction through the treater 1. At the same time, the polarity reversing relay (PRR) 48 is controlled to change the state of the contacts 49 so that the first two electrodes in the fluid path are of negative polarity.

The rectifier or DC power supply 44 is provided with a local voltage indicator (VI) 116 and a local current indicator (II) 117 as well as a current indicator transmitter (IIT) 118 which allows the controller 110 to monitor current flow through the treater 1. Temperature transmitters (TT) 119 and 120 monitor the temperature of liquid and exiting the treater 1. The controller 110 monitors the temperature rise of liquid passing through the treater 1 as a basis for controlling the current output of the rectifier 44 to thereby control the electrical efficiency of the process 2. In most cases, a current level which causes heating of the treated liquid beyond a selected amount is wasteful, and the current output of the rectifier 44 is lowered accordingly. On the other hand, if the process 2 is intended to destroy biological contaminants in the treated liquid, then the rectifier 44 is controlled to a maintain a desired temperature rise.

Numerous aspects of the process 2 which have been described and illustrated are intended to be exemplary and the particulars of the disclosed process 2 are not intended to limit the range of use of the treater 1.

It is to be understood that while certain forms of the present invention have been described and illustrated herein, it is not to be limited to the specific forms or arrangement of parts described and shown.

What is claimed and desired to be secured by Letters Patent is as follows:

1. A method of electrolytically treating liquids comprising the steps of:
   (a) positioning a plurality of first electrodes and a plurality of second electrodes in interleaved alternation within a treatment chamber to define a serpentine fluid path through a succession of sets of a first electrode and a second electrode between a first fluid connection and a second fluid connection, said fluid path having a first flow direction from said first fluid connection to said second fluid connection and a second flow direction from said second fluid connection to said first fluid connection;
   (b) providing DC power supply means having a positive pole and a negative pole;
   (c) interconnecting said first electrodes and said second electrodes with said power supply means in such a manner that the first two successive electrodes in one of said first or second flow directions through said fluid path are connected to said negative pole with the remainder of said electrodes alternating in polarity along said fluid path; and
   (d) flowing a liquid to be treated through said fluid path.

2. A method as set forth in claim 1 and including the steps of:
   (a) measuring a pressure differential between liquid entering said fluid path and liquid exiting said fluid path; and
   (b) automatically reversing said first or second flow direction of liquid through said fluid path in response to the measured differential pressure exceeding a selected value.

3. A method as set forth in claim 1 and including the steps of:
   (a) measuring a temperature differential between liquid entering said fluid path and liquid exiting said fluid path; and
   b) automatically controlling a current flow between said poles in response to the measured temperature differential.

4. A treater apparatus for electrolytically treating liquids and comprising:
   (a) a housing including a first electrode supporting wall and a second electrode supporting wall positioned in spaced apart relation and connected by opposite side walls to form a treatment chamber having opposite ends;
   (b) a first fluid connection member and a second fluid connection member, the fluid connection members extending respectively across opposite ends of said treatment chamber and sealingly engaging the electrode support walls and said side walls at a respective end of said treatment chamber;
   (c) each fluid connection member being formed by a tubular wall, having opposite tube ends adapted for fluid connection thereto, and having a fluid distribution passage therein;
   (d) aperture means formed in said tubular wall of each fluid connection member at a position to enable fluid communication between the associated distribution passage and said treatment chamber;
   (e) a plurality of elongated first electrodes extending from said first electrode support wall in spaced apart parallel relation and extending between said side walls;

(f) a plurality of elongated second extending from said second electrode support wall in spaced apart parallel relation and extending between said side walls;

(g) said first electrodes and second electrodes being distributed between said ends of said treatment chamber in interleaved alternation to form a substantially serpentine fluid path between successive sets of a first electrode and a second electrode; and (h) DC power supply means having a positive pole connected to one of the pluralities of said electrodes and a negative pole connected to the other of said pluralities of said electrodes.

5. A treater apparatus for electrolytically treating liquids and comprising:

(a) a housing including a first wall and a second wall spaced from said first wall to form a treatment chamber;

(b) said housing including a first fluid connection member and a second fluid connection member, said fluid connection members being at opposite ends of said treatment chamber and in fluid communication therewith; each fluid connection member including a tubular wall, having opposite tube ends adapted for fluid connection thereto, and having a fluid distribution passage therein; aperture means being formed in said tubular wall at a position to enable fluid communication between said distribution passage and said treatment chamber;

(c) flow reversing valve means fluidically connected to said first and second fluid connection members and being reversibly operable to flow a liquid through said fluid path in a selected flow direction between said fluid connections, said valve means including:

(1) a two way supply valve fluidically connected to one end each of said first fluid connection member and said second fluid connection member and adapted for connection to a supply conduit, said supply valve being operable to fluidically communicate with only one of said first or second fluid connection members;

(2) a two way discharge valve fluidically connected to an opposite end from said supply valve of each of said first fluid connection member and said second fluid connection member and adapted for connection to a discharge conduit, said discharge valve being operable to fluidically communicate with only one of said second or first fluid connection members; and (3) said supply and discharge valves being controlled in such a coordinated manner that in a forward state fluid flow from said first fluid connection member to said second fluid connection member is enabled and in a reverse state fluid flow from said second fluid connection member to said first fluid connection member is enabled;

(d) a plurality of elongated first electrodes extending from said first wall in spaced apart parallel relation;

(e) a plurality of elongated second electrodes extending from said second wall in spaced apart parallel relation;

(f) said first electrodes and second electrodes being distributed between said ends of said treatment chamber in interleaved alternation to form a substantially serpentine fluid path extending between successive sets of a first electrode and a second electrode; and (g) DC power supply means having a positive pole connected to one of the pluralities of said electrodes and a negative pole connected to the other of said pluralities of said electrodes.

6. A liquid treater apparatus comprising:

(a) a housing including a first fluid connection and a second fluid connection and having a fluid path between said fluid connections;

(b) a plurality of first electrodes;

(c) a plurality of second electrodes;

(d) said electrodes being alternatingly positioned within said housing to shape said fluid path into a substantially serpentine fluid path extending between said fluid connections and between successive sets of a first electrode and a second electrode;

(e) power supply means having a first pole connected to one of the pluralities of said electrodes and an opposite polarity second pole connected to the other of said pluralities of said electrodes;

(f) flow reversing valve means fluidically connected to said first and second fluid connections and being reversibly operable to flow a fluid through said fluid path in a selected flow direction between said fluid connections, said valve means being adapted for connection to a supply conduit to supply liquid to said apparatus and a discharge conduit to receive liquid from said apparatus; and (g) said valve means and said fluid connections cooperating in such a manner as to reverse a flow direction through said fluid path without reversing a flow direction through said supply conduit and said discharge conduit.

7. An apparatus as set forth in claim 6 and including:

(a) differential pressure sensor means connected to measure a pressure differential between liquid entering said first fluid connection and liquid exiting said second fluid connection; and (b) control means connected to said differential pressure sensor means and operative to activate said flow reversing valve means in response to the measured differential pressure exceeding a selected value.

8. A liquid treater apparatus comprising:

(a) a housing including a first fluid connection and a second fluid connection and having a fluid path between said fluid connections, said fluid path having a first flow direction from said first fluid connection to said second fluid connection and a second flow direction from said second fluid connection to said first fluid connection;

(b) a plurality of first electrodes;

(c) a plurality of second electrodes;

(d) said electrodes being alternatingly positioned within said housing to shape said fluid path into a substantially serpentine fluid path extending between said fluid connections and between successive sets of a first electrode and a second electrode;

(e) DC power supply means including a positive pole and a negative pole; and (f) electrode interconnection means interconnecting said first electrodes and said second electrodes with said power supply means in such a manner that the first two successive electrodes in one of said first or second flow directions through said fluid path are connected to said negative pole with the remainder of said electrodes alternating in polarity along said fluid path.

9. An apparatus as set forth in claim 8 and including:
(a) polarity switch means connecting said power supply means to at least one each of said first electrodes and said second electrodes and being reversibly operable to apply a selected opposite polarity to said at least one each of said first electrodes and said second electrodes.

10. An apparatus as set forth in claim 8 wherein each of said pluralities of electrodes includes:
(a) an integral multiple electrode unit formed by a plurality of electrode elements positioned in parallel spaced relation and extending from a connecting wall.

11. An apparatus as set forth in claim 8 and including:
(a) temperature differential sensor means connected to measure a temperature differential between liquid entering said first fluid connection member and liquid exiting said second fluid connection member; and
(b) control means connected to said power supply means, having said temperature sensor means connected thereto, and controlling a current flow between said poles in response to the measured temperature differential.

12. A treater apparatus for electrolytically treating liquids and comprising:
(a) a housing including a first wall and a second wall spaced from said first wall to form a treatment chamber;
(b) said housing including a first fluid connection and a second fluid connection, said fluid connections being at opposite ends of said treatment chamber and in fluid communication therewith;
(c) a plurality of elongated first electrodes extending from said first wall in spaced apart parallel relation;
(d) a plurality of elongated second electrodes extending from said second wall in spaced apart parallel relation;
(e) said first electrodes and second electrodes being distributed between said ends of said treatment chamber in interleaved alternation to form a substantially serpentine fluid path extending between successive sets of a first electrode and a second electrode, said fluid path having a first flow direction from said first fluid connection to said second fluid connection and a second flow direction from said second fluid connection to said first fluid connection;
(f) DC power supply means including a positive pole and a negative pole; and
(g) electrode interconnection means interconnecting said first electrodes and said second electrodes with said power supply means in such a manner that the first two successive electrodes in one of said first or second flow directions through said fluid path are connected to said negative pole with the remainder of said electrodes alternating in polarity along said fluid path.

13. An apparatus as set forth in claim 12 and including:
(a) differential pressure sensor means connected to said apparatus to measure a pressure differential between liquid entering said first fluid connection and liquid exiting said second fluid connection;
(b) flow reversing valve means fluidically connected to said first and second fluid connections and being reversibly operable to flow a liquid through said fluid path in a selected flow direction between said fluid connections; and
(c) control means connected to said differential pressure sensor means and operative to activate said flow reversing valve means in response to the measured differential pressure exceeding a selected value.

14. An apparatus as set forth in claim 12 wherein each fluid connection includes:
(a) a tubular fluid connection member formed by a tubular wall, having opposite tube ends adapted for fluid connection thereto, and having a fluid distribution passage therein; and
(b) aperture means formed in said tubular wall at a position to enable fluid communication between said distribution passage and said treatment chamber.

15. An apparatus as set forth in claim 12 and including:
(a) polarity switch means connecting said power supply means to at least one each of said first electrodes and said second electrodes and being reversibly operable to apply a selected opposite polarity to said at least one each of said first electrodes and said second electrodes.

16. An apparatus as set forth in claim 12 and including:
(a) a conductive bus bar extending along an outer surface of each of said walls;
(b) conductive fasteners connecting between said bus bar and the electrodes mounted on the associated wall through said associated wall; and
(c) one of said poles of said power supply means being connected to said bus bar.

17. An apparatus as set forth in claim 12 and including:
(a) temperature differential sensor means connected to measure a temperature differential between liquid entering said first fluid connection member and liquid exiting said second fluid connection member; and
(b) control means connected to said power supply means, having said temperature sensor means connected thereto, and controlling a current flow between said poles in response to the measured temperature differential.

* * * * *